(12) United States Patent
Kim et al.

(10) Patent No.: US 8,275,202 B2
(45) Date of Patent: Sep. 25, 2012

(54) METHOD OF GROUPING PIXELS IN 2D DIGITAL IMAGE

(75) Inventors: Joo Hyun Kim, Gyunggi-do (KR); Bong Soon Kang, Busan (KR); Sung Jin Lee, Busan (KR); Hyo Won Jeong, Gyeongsangnam-do (KR); Won Tae Choi, Gyunggi-do (KR); Boo Dong Kwak, Gyunggi-do (KR)

(73) Assignee: Samsung Electro-Mechanics Co., Ltd., Gyunggi-do (KR)

(*) Notice: Subject to any disclaimer, the term of this patent is extended or adjusted under 35 U.S.C. 154(b) by 849 days.

(21) Appl. No.: 12/413,935

(22) Filed: Mar. 30, 2009

(65) Prior Publication Data

US 2010/0150444 A1 Jun. 17, 2010

(30) Foreign Application Priority Data

Dec. 15, 2008 (KR) .................. 10-2008-0127294

(51) Int. Cl.
*G06K 9/00* (2006.01)
(52) U.S. Cl. ........................ 382/173; 382/180
(58) Field of Classification Search .................. 382/173, 382/180, 205, 282, 286, 307, 308
See application file for complete search history.

(56) References Cited

U.S. PATENT DOCUMENTS 4,847,786 A * 7/1989 Wang et al. .................. 382/171
4,991,224 A * 2/1991 Takahashi et al. ............ 382/180

FOREIGN PATENT DOCUMENTS

KR 10-2007-0035655 A 4/2007

OTHER PUBLICATIONS

Jain, R., et al. "Machine Vision", McGraw-Hill, pp. 46-47 1995, ISBN 0-07-113407-7.
Korean Office Action for Application No. 10-2008-0127294 issued Mar. 23, 2010.

* cited by examiner

*Primary Examiner* — Phuoc Tran
(74) *Attorney, Agent, or Firm* — Lowe, Hauptman, Ham & Berner, LLP

(57) ABSTRACT

There is provided a method of grouping pixels in a 2D digital image that assigns labels to regions of objects to differentiate between objects separated in the input image and groups a region of an object having the same label into one group when pattern recognition and image process are performed on the 2D digital image. A method of grouping pixels in a 2d digital image according to an aspect of the invention may include: determining whether a target pixel in an input image is included in a labeling section; determining whether the target pixel is connected to a previous pixel of the target pixel and an upper pixel located adjacent to and above the target pixel to perform a labeling process, and renewing a label table while saving a labeling result in a line memory when the target pixel is included in the labeling section and is a valid pixel including object information; and grouping pixels of the input image using the labeling result and the renewed label table, and renewing a group.

8 Claims, 8 Drawing Sheets

GROUPING

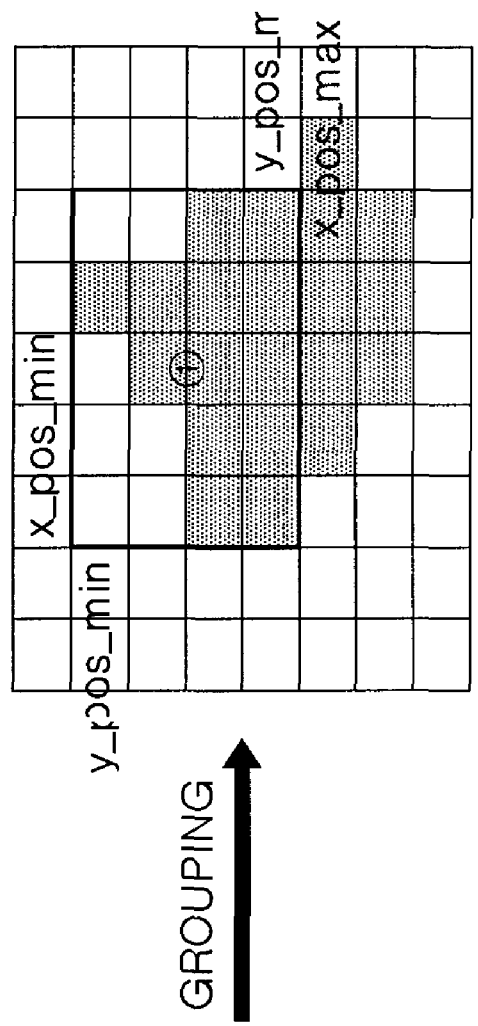
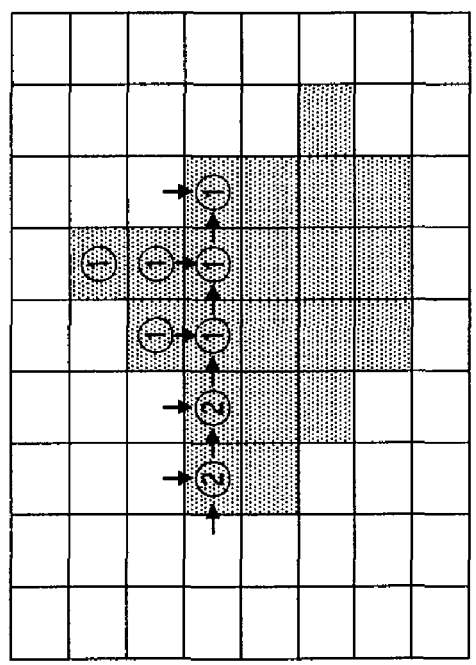
FIG. 8B
FIG. 8A

METHOD OF GROUPING PIXELS IN 2D DIGITAL IMAGE

CROSS-REFERENCE TO RELATED APPLICATIONS

This application claims the priority of Korean Patent Application No. 2008-0127294 filed on Dec. 15, 2008, in the Korean Intellectual Property Office, the disclosure of which is incorporated herein by reference.

BACKGROUND OF THE INVENTION

1. Field of the Invention

The present invention relates to two-dimensional digital image processing, and more particularly, to a method of grouping pixels in a 2D digital image that assigns labels to regions of objects to differentiate between the objects separated in the input image and groups a region of an object having the same label into one group when pattern recognition and image process are performed on the 2D digital image.

2. Description of the Related Art

In general, in order to perform image processing, such as pattern recognition, of a two-dimensional (2D) image that consists of a plurality of pixels, labels are given to pixels representing a particular color or an object having a particular shape, and then a grouping process needs to be performed to combine pixels having the same label that form a region into one group.

Labeling or grouping schemes, which have been known in the related art, may include a labeling method that sequentially checks pixels adjacent to a target pixel until all pixels connected to the target pixel are labeled using a recursive call according to an 8-adjacent method. However, in this method, the recursive call is repeated until the labeling process is completed. Therefore, when an image increases in size or an object in the image is large, the processing rate may be decreased due to excessive recursive calls. Furthermore, a labeling process is performed after pixel information about one frame of the image is completely stored, which makes it difficult to realize real-time processing. An external memory is separately used to save the information on the one frame, which makes hardware implementation difficult.

Another labeling or grouping scheme, which has been known in the art, may include a labeling method that combines pixels having the same label into one group having the shape of a square, forming a window on the basis of a target pixel to search for information about each group and assign a label to the target pixel, and correcting the group information of the target pixel. This labeling scheme allows real-time image processing, facilitates hardware design, and can control a search range by controlling the range of the window since neighboring pixels are searched using the window. However, when a pixel, which is not connected to the target pixel, is within the search range, the pixel also belongs to the same group. As a result, it may be difficult to accurately differentiate between the regions of objects.

SUMMARY OF THE INVENTION

An aspect of the present invention provides a method of grouping pixels in a 2D digital image that can facilitate hardware implementation and perform a labeling process by accurately differentiating regions of objects of the image in real time in the input of a 2D digital image.

According to an aspect of the present invention, there is provided method of grouping pixels in a 2d digital image, the method including: determining whether a target pixel in an input image is included in a labeling section; determining whether the target pixel is connected to a previous pixel of the target pixel and an upper pixel located adjacent to and above the target pixel to perform a labeling process, and renewing a label table while saving a labeling result in a line memory when the target pixel is included in the labeling section and is a valid pixel including object information; and grouping pixels of the input image using the labeling result and the renewed label table, and renewing a group.

The renewing of the label table may include: determining whether the target pixel is a valid pixel including object information; performing a labeling process on the target pixel when the target pixel is a valid pixel; saving the labeling result in the line memory; and renewing the label table to reflect changes according to the labeling results.

The method may further include determining whether a labeling process is completed by searching to determine whether a region of a group exists in a line preceding the corresponding line when it is determined that the target pixel is not a valid pixel, and initializing the group using information about the group.

The method may further include: renewing data of the line memory using the label table when the target pixel is not included in the label region; and initializing the label table to perform a labeling process on the next line after the renewing of the data of the line memory is completed.

The performing of the labeling process may be labeling the target pixel according to whether the target pixel, the previous pixel, and the upper pixel are valid pixels.

The performing of the labeling process may include: searching for information about a group and information about the label table and assigning the number of a group having an initial value as a label of the target pixel when only the target pixel among the target pixel, the previous pixel and the upper pixel is a valid pixel, searching for a value of the label table corresponding to a label of the upper pixel, assigning the searched value as the label of the target pixel, and changing a value of the label table corresponding to a label of the previous pixel into the label of the upper pixel when the target pixel, the previous pixel, and the upper pixel are all valid pixels, searching for a value of the label table corresponding to a value of the label table corresponding to a label of the previous pixel, and assigning the searched value as a label of the target pixel when the target pixel and the previous pixel are valid pixels, and searching for a value of the label table corresponding to a label of the upper pixel, and assigning the searched value as a label of the target pixel when the target pixel and the upper pixel are valid pixels.

The saving of the line memory may be saving a result of labeling every pixel in each line included in the labeling section in the line memory having the same length as the labeling section in real time.

The grouping and the renewing of the group may include: saving coordinates of the target pixel in a group having the same number as a newly assigned label of the target pixel as information of the group when only the target pixel among the target pixel, the previous pixel and the upper pixel is a valid pixel, incorporating a group of the previous pixel into a group of the upper pixel, comparing information about group of the upper pixel, information about the group of the previous pixel, and the coordinates of the target pixel, and saving coordinates covering all the information and the coordinates as information of the incorporated group when the target pixel, the previous pixel, and the upper pixel are all valid pixels, comparing the group information of the previous pixel and the coordinates of the target pixel, and saving coordinates including the coordinates of the target pixel in the group of the previous pixel when the target pixel and the previous pixel are valid pixels, and comparing the group information of the upper pixel and the coordinates of the target pixel, and saving coordinates including the coordinates of the target pixel in the group of the upper pixel.

BRIEF DESCRIPTION OF THE DRAWINGS

The above and other aspects, features and other advantages of the present invention will be more clearly understood from the following detailed description taken in conjunction with the accompanying drawings, in which:

FIGS. 5 through 8 are views illustrating a labeling method and a grouping method according to an exemplary embodiment of the present invention.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art.

Figure 1:
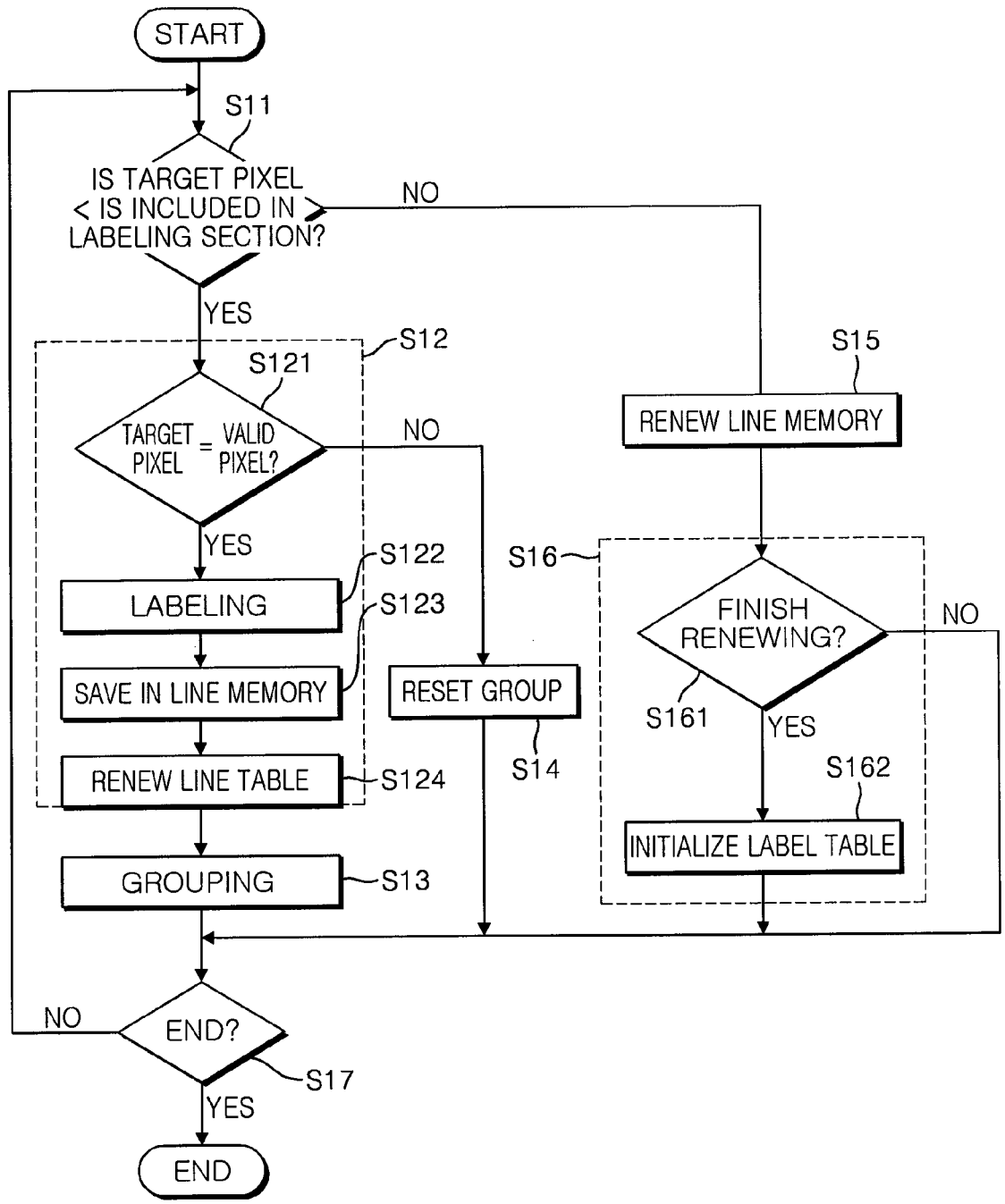
FIG. 1 is a flowchart illustrating a labeling method of a 2D digital image according to an exemplary embodiment of the present invention.

FIG. 1 is a flowchart illustrating a labeling method of a two-dimensional (2D) digital image according to an exemplary embodiment of the invention. Referring to FIG. 1, in a labeling method of a 2D digital image according to this embodiment, it is determined whether a target pixel of an input image belongs to a labeling section in operation S11. Then, when the target pixel belongs to the labeling section and is a valid pixel containing object information, it is determined whether the target pixel is connected to a previous pixel or an upper pixel a labeling process is performed, to perform a labeling process, and then a label table is renewed, saving a labeling result in a line memory, in operation S12. A grouping process is performed on the input image using the labeling result and the renewed label table, and a group is renewed in operation S13.

In operation S12, it is determined whether the target pixel is a valid pixel containing object information in operation S121, a labeling process is performed on the target pixel when the target pixel is a valid pixel in operation S122, the labeling result is saved in the line memory S123, and the label table is renewed to reflect the change in labels according to the labeling result in operation S124.

Further, in this embodiment of the invention, if the target pixel is determined not to be a valid pixel in operation S121, it is determined whether the labeling process has been completed by searching to determine whether a region of a group exists in a line preceding the corresponding line, and the group is initialized using conditions such as the size of the group, and the ratio between the width and the height of the group in operation S14. In operation S14 of group initialization, the group is initialized according to a few appropriate conditions such as the size of the group, and the ratio between width and height of the group.

Further, in this embodiment, when the target pixel is not included in the labeling section in operation S11, data in the line memory is renewed using the label table in operation S15. Then, after the renewal of the data in the line memory is terminated, the label table is initialized for the labeling process of the next line in operation S16.

Hereinafter, the operation and effect of one exemplary embodiment of the invention having the above-described configuration will be described in detail with reference to the accompanying drawings.

Figure 2:
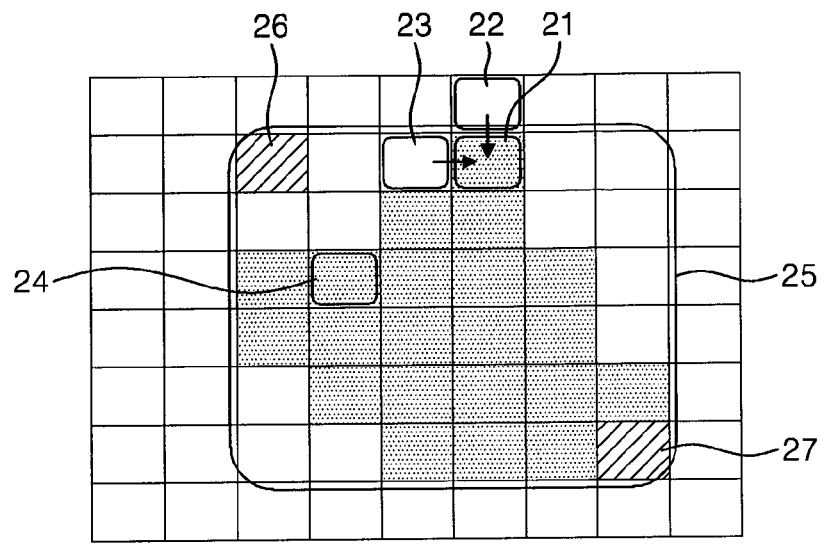
FIG. 2 is a view illustrating a part of a 2D digital image to which a labeling method of a 2D digital image according to an exemplary embodiment of the present invention is applied.

FIG. 2 is a view illustrating a part of a digital image to which a labeling method of a 2D digital image according to an exemplary embodiment of the invention is applied. As shown in FIG. 2, a target pixel 21 is currently input and is a target for determination such as labeling. Among pixels connected to the target pixel 21, an upper pixel 22 and a previous pixel 23 are input before the target pixel. Further, in FIG. 2, a pixel, designated by '24', contains object information and is referred to as a valid pixel. Valid pixels are labeled and combined into a group, which is designated by reference numeral '25'. By drawing the pixels on the coordinates, the information on the group is defined by coordinates (x_pos_min, y_pos_min) and (x_pos_max, y_pos_max) of a pixel 26, which is the earliest input pixel, and a pixel 27, which is the latest input pixel, respectively.

When the labeling method of the 2D digital image according to this embodiment starts to be performed, it is determined whether a pixel being input is included in a labeling section or not in operation S11. When the input pixel is not included in the labeling section, data in a line memory is renewed using a label table in operation S15. After the renewal of the data in the line memory is completed, the label table is initialized to perform a labeling process of the next line in operation S16. Initial values, shown in the label table, are in Table 1 as follows.

TABLE 1

| Label | Data |
| --- | --- |
| 1 | 1 |
| 2 | 2 |
| 3 | 3 |
| 4 | 4 |
| 5 | 5 |
| ... | ... |

In Table 1, "Label" corresponds to label values that indicate the address of the label table and have been saved in the line memory before renewing the line memory, and "Data" includes values saved to reflect changes in label corresponding to the address of the label table and corresponds to a label that is finally assigned to each pixel.

In this embodiment of the invention, it requires time to renew the line memory as long as the line memory is in the operation of renewing the data of the memory (S15). Therefore, instead of labeling the entire pixels of the 2D digital image being input, some of the pixels are labeled, the rest are not labeled, and the data of the line memory is renewed for a period of time when the rest of the pixels are input. To this end, in one example of this embodiment of this embodiment, one pixel line is divided into four regions, pixels belonging to the two central regions may be labeled, and data in a line memory is renewed without performing a labeling process when pixels of both edge regions are input. In another example of this embodiment of the invention, all pixels of one pixel line are labeled, and then pixels of the next line are not labeled but a line memory is renewed. That is, in another example of this embodiment of the invention, the operation of labeling pixels and the operation of renewing the data of the line memory can alternate with each other.

Figure 3:
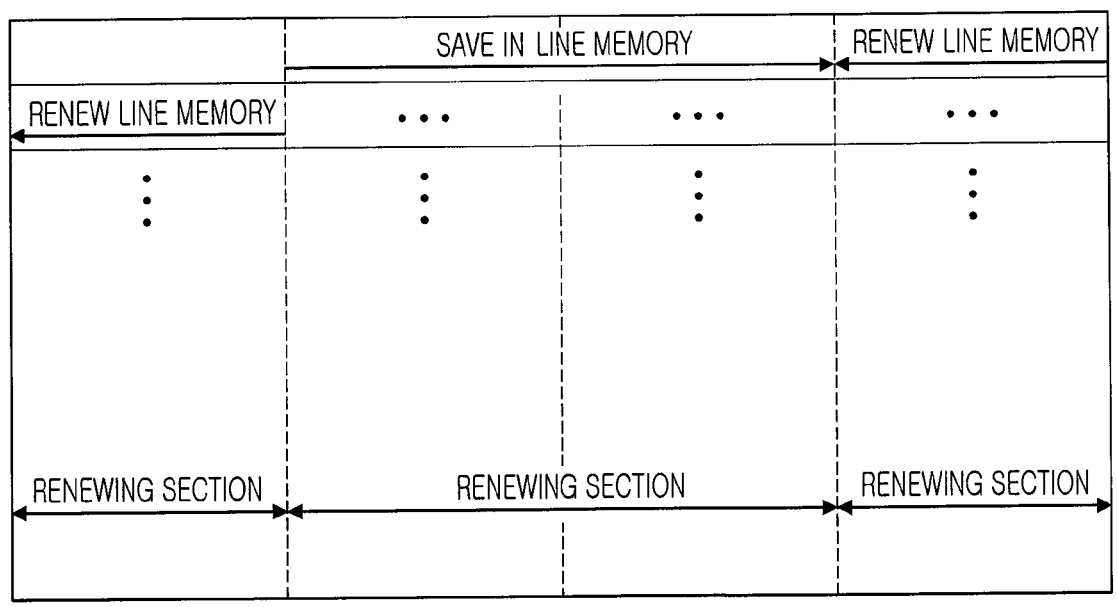
FIGS. 3 and 4 are views illustrating sections where labeling and line memory renewal are performed in the 2D digital image according to the above-described embodiment of the invention.
Figure 4:
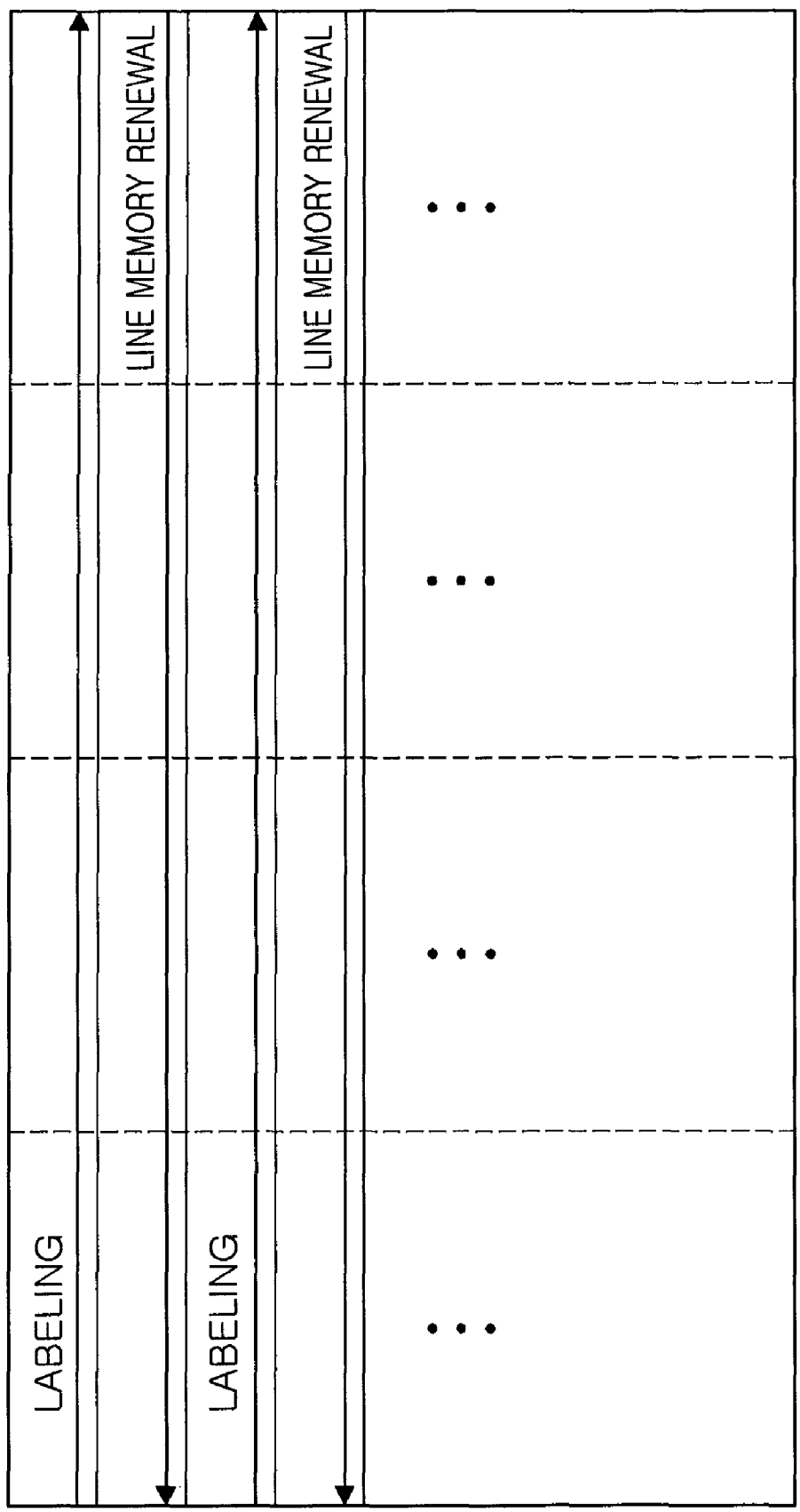

FIGS. 3 and 4 are views illustrating sections of a 2D digital image where labeling and line memory renewal are performed according to the above-described exemplary embodiment of the invention.

FIG. 3 is a view illustrating the former example, that is, a method of performing a labeling process on two central sections. Information on a labeling process performed on labeling sections located at the center of each line is renewed in line memory renewing sections consisting of the last quarter of the line and the first quarter of the next line. FIG. 4 is a view illustrating the latter example, that is, a method of alternately performing a labeling process and a line memory renewing process according to lines. For example, the labeling process may begin at a start point of an odd-numbered line, and the line memory renewing process may be performed in an even-numbered line. As indicated by the arrows in FIGS. 3 and 4, labeling results in the two examples are sequentially saved in the line memory, and the line memory is renewed in the reverse order in which the labeling results are saved.

As shown in FIGS. 3 and 4, in operation S11, it is determined whether the input target pixel is included in the labeling section. When it is determined that the target pixel is included in the labeling section, the target pixel is labeled in operation S12.

In operation S12, illustrated in FIG. 1, it is determined whether the target pixel is a valid pixel or not in operation S121. Then, when the target pixel is a valid pixel, it is determined whether the target pixel 21, the previous pixel 23, and the upper pixel 22 are connected to each other or not, and labeling is performed in operation S122. Labeling results are saved in the line memory in operation S123, and the label table is changed in operation S124. This operation S12 and the operation S15 of renewing the data of the line memory are key processes in this embodiment of the invention. This operation S12 can be applied to the above-described two examples of determining labeling sections.

In operation S121, it is determined whether the target pixel is a valid pixel. When the target pixel is a valid pixel, the target pixel is then labeled in operation S122. Further, the labeling result is saved in the line memory. The label saved in the line memory is used as the address of the label table when the data of the line memory is renewed after the labeling process of the corresponding line is completed. Then, in operation S124, a change in label is searched for according to the labeling result to renew the label table.

FIGS. 5A, 6A, 7A, and 8A are views illustrating four labeling methods according to whether a target pixel, an upper pixel, and a previous pixel are connected to each other by taking a simple object as an example.

Figure 5B:
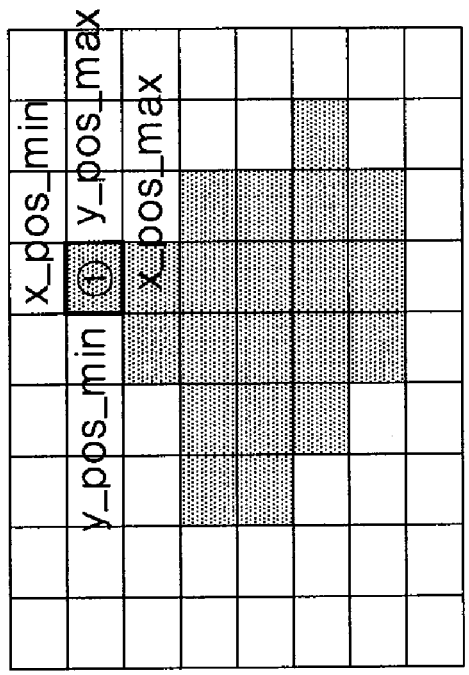
Figure 5A:
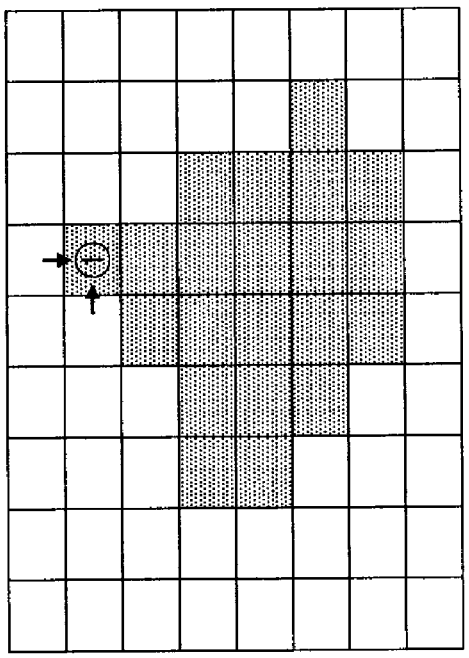

In FIG. 5A, only the target pixel is a valid pixel. Information about a group and information about a label table are searched to assign a number of a group having an initial value as a label of the target pixel.

Figure 6B:
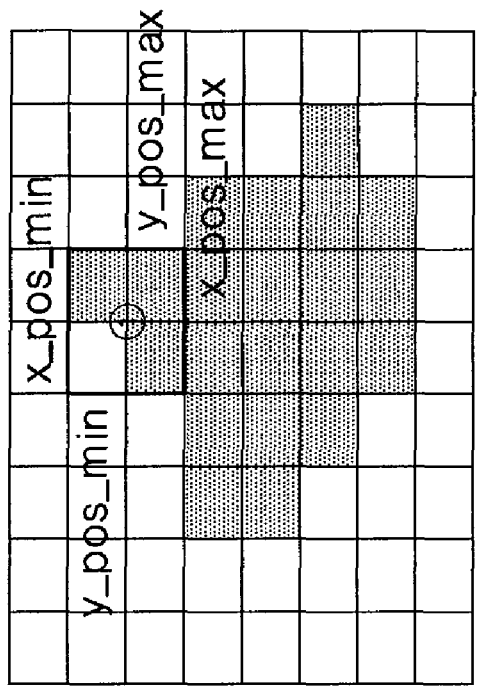
Figure 6A:
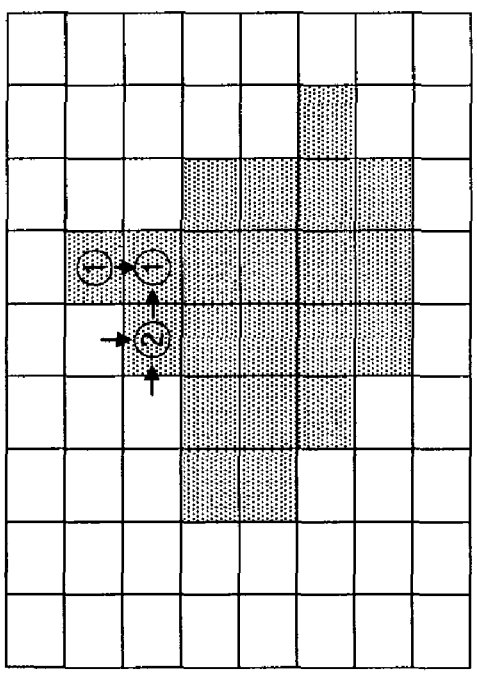

In FIG. 6A, the target pixel, the previous pixel, and the upper pixel are all valid pixels. A value of the label table that corresponds to the label of the upper pixel is searched for, and the value is assigned as a label of the target pixel. Then, a value of the label table that corresponds to a label of the previous pixel is changed into the corresponding label of the upper pixel.

Figure 7B:
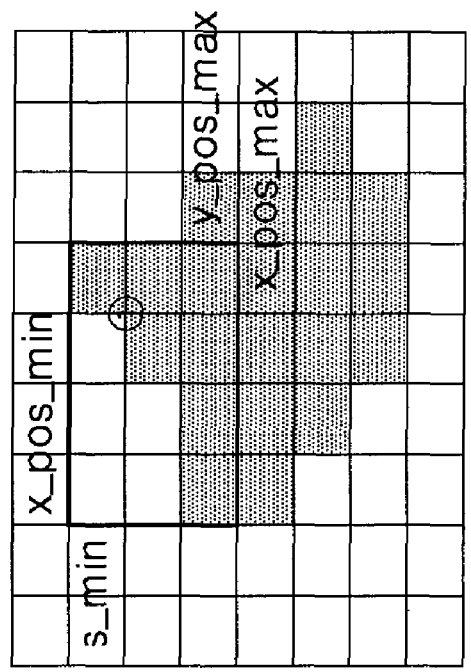
Figure 7A:
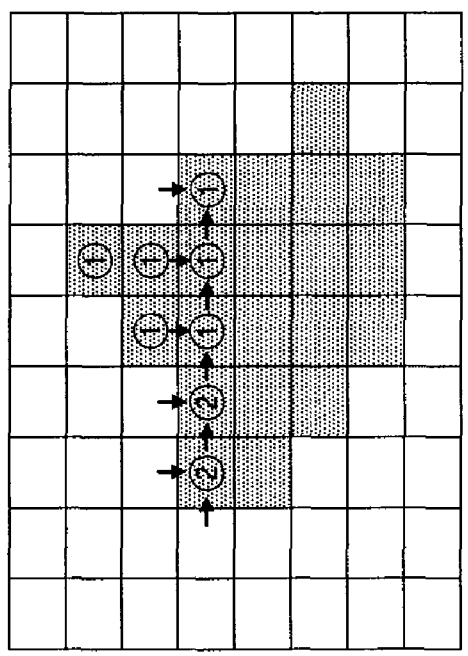

In FIG. 7A, when the target pixel and the previous pixel are valid pixels, a value of a label corresponding to the label of the previous pixel is searched for, and the value is assigned as a label of the target pixel.

In FIG. 8A, the target pixel and the upper pixel are valid pixels. A value in the label table that corresponds to the label of the upper pixel is searched for, and the value is assigned as a label of the target pixel.

After the above-described labeling process is completed, a labeling result is saved in the line memory, and the label table is initialized.

Then, in operation S13, a grouping process is performed using the labeling result and the label table, and a group is amended. When a label table value corresponding to a label assigned to the target pixel is equal to a previously determined number of a group, the target pixel is made to be included in the group. Then, the minimum coordinates (x_pos_min, y_pos_min) of the group and the maximum coordinates (x_pos_max, y_pos_max) of the group that contain information on the group are compared with coordinates (x_pos, y_pos) of the target pixel. When the coordinates of the target pixel are smaller than the minimum coordinates of the target pixel, the minimum coordinates are amended to the coordinates of the target pixel. When the coordinates of the target pixel are greater than the maximum coordinates of the group, the maximum coordinates are amended to the coordinates of the target pixel. FIGS. 8B, 9B, 10B, and 11B are views illustrating a process in which labeling is first performed and then grouping is performed by taking a simple object as an example.

In FIG. 5B, only the target pixel is a valid pixel. The coordinates of the target pixel are saved as information of a group having the same number as a label of the target pixel that is newly assigned.

In FIG. 6B, the target pixel, the previous pixel, and the upper pixel are valid pixels. The group of the previous pixel is incorporated into the group of the upper pixel. The coordinates of group information on the upper pixel, group information on the previous pixel, and the coordinates of the target pixel are compared so that the coordinates that can cover all the group information and the coordinates are saved as information of the incorporated group.

In FIG. 7B, the target pixel and the previous pixel are valid pixels. After the coordinates of the target pixel and the group information on the previous pixel are compared, coordinates including the coordinates the target pixel are saved in the group of the previous pixel.

In FIG. 8B, the target pixel and the upper pixel are valid pixels. After the coordinates of the target pixel and the group information on the upper pixel are compared, coordinates including the coordinates of the target pixel are saved in the group of the upper pixel.

Meanwhile, as a result of determining whether the target pixel is a valid pixel, if the target pixel is not a valid pixel, it is determined in operation S14 whether the labeling process has been completed or not by searching to determine whether a region of a group exists in a line preceding the corresponding line, and the group is initialized according to conditions such as the size of the group and the ratio between the width and the height of the group.

$$y\_max\_pos < y\_pos\text{-line} \qquad [\text{Equation 1}]$$

According to the above-described Equation 1, a method of determining whether the labeling process is completed is provided. In Equation 1, y_pos is a variable indicating which line a target pixel is in, and line is a variable used to determine what line preceding the corresponding line will be searched. After it is checked whether a region of a group is included in a line-th line before the corresponding line, if the region of the group exists, it is determined that the labeling process has not been completed. When the region of the group does not exist, it is determined that the labeling process with respect to the group has been completed. The group is initialized to limit the number of groups to a proper number at an early stage so as to realize hardware implementation and reduce the size of the hardware. Conditions for group initialization are arranged and summarized below in Table 2. Equation 2 is shown to obtain variables shown in Table 2.

TABLE 2

| | Conditions for initialization |
|---|---|
| Size of group | grp_dimension < dim_min × dimension |
| | grp_dimension > dim_max × dimension |
| Ratio between width and height of group | x_length < y_length × y_leng_check |
| | y_length < x_length × x_leng_check |

$$x\_length = x\_pos\_max - x\_pos\_min$$
$$y\_length = y\_pos\_max - y\_pos\_min$$
$$dimension = x\_width \times y\_height$$
$$grp\_dimension = x\_length \times y\_length \qquad [\text{Equation 2}]$$

In Table 2 and Equation 2, grp_dimension is the size of the group, dimension is the size of an input image, and x_length and y_length are a measurement of the width and a measurement of the height of the group, respectively. Further, x_width and y_height are a length (width) of a line and the number (height) of lines of the input image, respectively. Variables dim_min, dim_max, y_leng_check, and x_leng_check are used for comparison. A user can adjust the variables to determine conditions of the initialization for the group.

Figure 9:
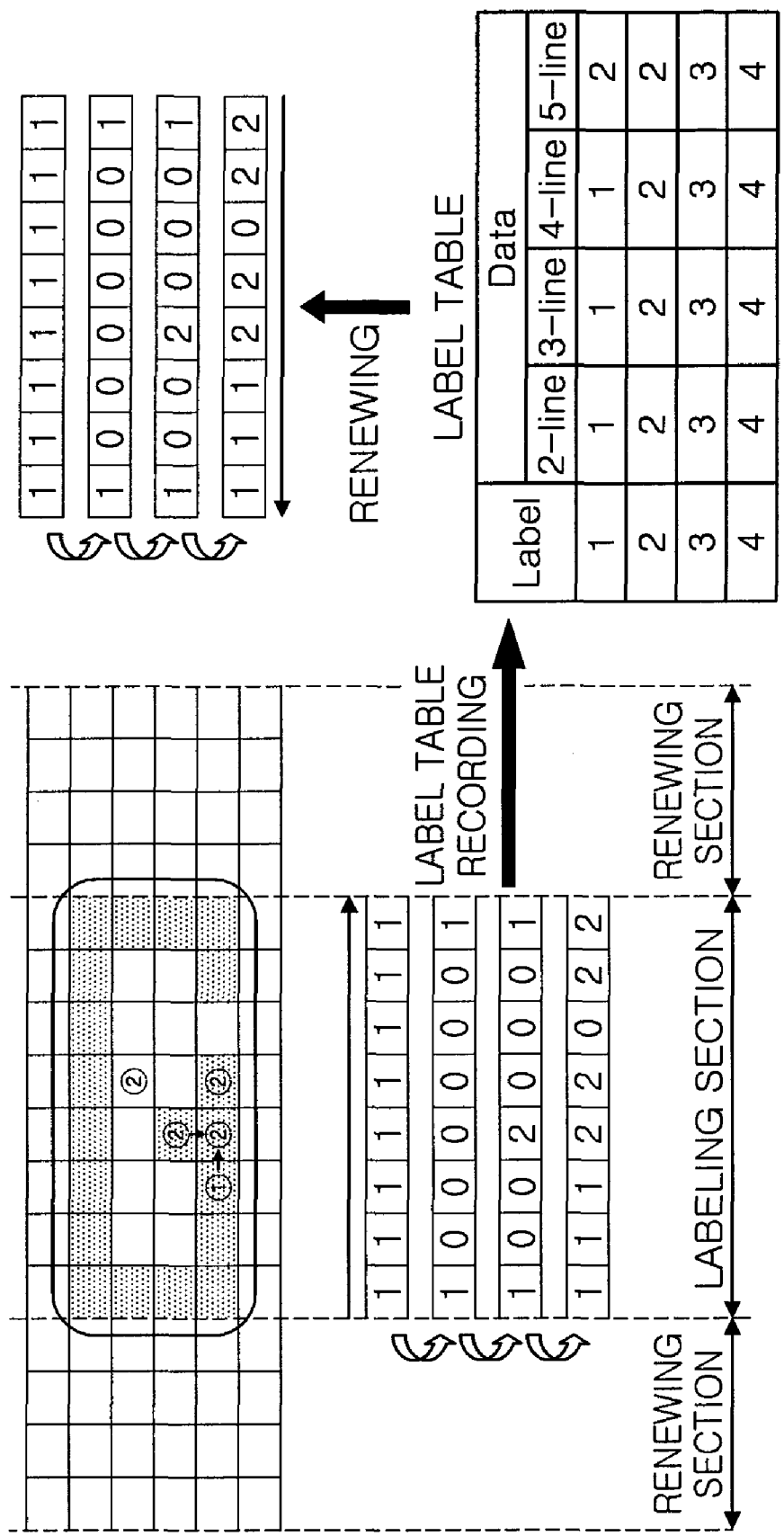
FIG. 9 is a view illustrating a labeling and grouping method and a line memory renewing method according to an exemplary embodiment of the present invention.

FIG. 9 is a view illustrating a labeling/grouping method and a line memory renewing method according to an exemplary embodiment of the invention. FIG. 9 is a view illustrating an example in which a labeling process is performed on a central part of a line, and line memory is renewed on both side ends of the line. In FIG. 9, in a part given labels in a fifth line of an input image, a label assigned to each target pixel is saved in the line memory. At the same time, when a label assigned to the previous pixel is different from the label assigned to the target pixel, a value of the label table that corresponds to the label assigned to the previous pixel is amended to save the change. When the process of labeling the line is completed, values saved in the line memory are renewed into values of the label table that correspond to the labels saved in the line memory in the reverse order, in which the labeling results have been saved in the line memory, until a process of labeling the next line starts.

As described above, since pixels being input can be labeled and grouped in real time using a line memory, the invention can be effectively applied to real-time image processing. Further, when the labeling result of one line is saved using one line memory, the labeling result can be used to search for a label of an upper pixel when the labeling process is performed on the next line. When a previously assigned label is changed into a different label when performing a labeling process on the corresponding line, this is saved in the label table. Then, labels saved in the line memory are renewed after the labeling process on the corresponding line is completed, which facilitates hardware implementation.

As set forth above, according to exemplary embodiments of the invention, since pixels being input are labeled using a line memory in real time and incorporated into a group, the invention can be effectively applied to real-time image processing. Further, a labeling result of one line is saved using one line memory so that the labeling result is used to search a label of an upper pixel when a labeling process on the next line is performed. Further, when a previously assigned label is changed into a different label while performing the labeling process on the corresponding line, this is saved in a label table. Then, labels saved in the line memory are renewed when the labeling process on the corresponding line is completed, which facilitates hardware implementation.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of grouping pixels in a 2d digital image, the method comprising:
   determining whether a target pixel in an input image is included in a labeling section;
   determining whether the target pixel is connected to a previous pixel of the target pixel and an upper pixel located adjacent to and above the target pixel to perform a labeling process, and renewing a label table while saving a labeling result in a line memory when the target pixel is included in the labeling section and is a valid pixel including object information; and
   grouping pixels of the input image using the labeling result and the renewed label table, and renewing a group.

2. The method of claim 1, wherein the renewing of the label table comprises:
   determining whether the target pixel is a valid pixel including object information;
   performing a labeling process on the target pixel when the target pixel is a valid pixel;
   saving the labeling result in the line memory; and
   renewing the label table to reflect changes according to the labeling result.

3. The method of claim 1, further comprising determining whether a labeling process is completed by searching to determine whether a region of a group exists in a line preceding the corresponding line when it is determined that the target pixel is not a valid pixel, and initializing the group using information about the group.

4. The method of claim 1, further comprising:
   renewing data of the line memory using the label table when the target pixel is not included in the label region; and
   initializing the label table to perform a labeling process on the next line after the renewing of the data of the line memory is completed.

5. The method of claim 2, wherein the performing of the labeling process is labeling the target pixel according to whether the target pixel, the previous pixel, and the upper pixel are valid pixels.

6. The method of claim 5, wherein the performing of the labeling process comprises:
   searching for information about a group and information about the label table and assigning the number of a group having an initial value as a label of the target pixel when only the target pixel among the target pixel, the previous pixel and the upper pixel is a valid pixel, searching for a value of the label table corresponding to a label of the upper pixel, assigning the searched value as the label of the target pixel, and changing a value of the label table corresponding to a label of the previous pixel into the label of the upper pixel when the target pixel, the previous pixel, and the upper pixel are all valid pixels, searching for a value of the label table corresponding to a value of the label table corresponding to a label of the previous pixel, and assigning the searched value as a label of the target pixel when the target pixel and the previous pixel are valid pixels, and searching for a value of the label table corresponding to a label of the upper pixel, and assigning the searched value as a label of the target pixel when the target pixel and the upper pixel are valid pixels.

7. The method of claim 2, wherein the saving of the line memory is saving a result of labeling every pixel in each line included in the labeling section in the line memory having the same length as the labeling section in real time.

8. The method of claim 1, wherein the grouping and the renewing of the group comprises:

saving coordinates of the target pixel in a group having the same number as a newly assigned label of the target pixel as information of the group when only the target pixel among the target pixel, the previous pixel and the upper pixel is a valid pixel, incorporating a group of the previous pixel into a group of the upper pixel, comparing information about group of the upper pixel, information about the group of the previous pixel, and the coordinates of the target pixel, and saving coordinates covering all the information and the coordinates as information of the incorporated group when the target pixel, the previous pixel, and the upper pixel are all valid pixels, comparing the group information of the previous pixel and the coordinates of the target pixel, and saving coordinates including the coordinates of the target pixel in the group of the previous pixel when the target pixel and the previous pixel are valid pixels, and comparing the group information of the upper pixel and the coordinates of the target pixel, and saving coordinates including the coordinates of the target pixel in the group of the upper pixel.

* * * * *